United States Patent
Lyman et al.

(10) Patent No.: US 11,153,712 B2
(45) Date of Patent: *Oct. 19, 2021

(54) CONFIGURING MOBILE DEVICE APPLICATIONS BASED ON LOCATION

(71) Applicant: eBay Inc., San Jose, CA (US)

(72) Inventors: Nate L. Lyman, Livermore, CA (US); Frank Russo, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,919

(22) Filed: Jul. 23, 2020

(65) Prior Publication Data

US 2020/0359164 A1 Nov. 12, 2020

Related U.S. Application Data

(63) Continuation of application No. 16/595,989, filed on Oct. 8, 2019, now Pat. No. 10,785,596, which is a (Continued)

(51) Int. Cl.
*H04W 24/00* (2009.01)
*H04W 4/021* (2018.01)
(Continued)

(52) U.S. Cl.
CPC ............. *H04W 4/021* (2013.01); *H04L 67/18* (2013.01); *H04L 67/34* (2013.01); *H04W 4/50* (2018.02)

(58) Field of Classification Search
CPC ........ H04W 4/021; H04W 4/50; H04L 67/18; H04L 67/34
(Continued)

(56) References Cited

U.S. PATENT DOCUMENTS 6,259,381 B1 7/2001 Small
7,848,765 B2 12/2010 Phillips et al.
(Continued)

FOREIGN PATENT DOCUMENTS

CA 2881660 C 3/2014
CN 1650649 A 8/2005
(Continued)

OTHER PUBLICATIONS

Office Action for Chinese Patent Application No. 201380045296.2 dated Jun. 27, 2017, 12 pages (6 pages of English Translation and 6 pages of Official Copy).
(Continued)

*Primary Examiner* — Temica M Beamer
(74) *Attorney, Agent, or Firm* — FIG. 1 Patents

(57) ABSTRACT

Various implementations monitor a parent geofence that geographically encompasses a plurality of child geofences, each respective child geofence of the child geofences associated with a respective physical location within the parent geofence. One or more implementations receive location data that indicates a current location of a mobile device. In turn, the current location can be used to determine that the mobile device has entered a particular child geofence of the plurality of child geofences. In response to determining that the mobile device has entered the particular child geofence, one or more implementations select an application configuration for a mobile application on the mobile device, where the application configuration corresponds to the particular child geofence. One or more implementations transmit the application configuration to the mobile device effective to alter a functionality of the mobile application at the mobile device based on the current location.

20 Claims, 9 Drawing Sheets

Related U.S. Application Data continuation of application No. 16/399,781, filed on Apr. 30, 2019, now Pat. No. 10,516,966, which is a continuation of application No. 16/138,585, filed on Sep. 21, 2018, now Pat. No. 10,334,396, which is a continuation of application No. 15/620,132, filed on Jun. 12, 2017, now Pat. No. 10,117,041, which is a continuation of application No. 15/240,375, filed on Aug. 18, 2016, now Pat. No. 9,681,253, which is a continuation of application No. 13/958,340, filed on Aug. 2, 2013, now Pat. No. 9,451,403.

(60) Provisional application No. 61/695,196, filed on Aug. 30, 2012.

(51) Int. Cl.
  *H04L 29/08* (2006.01)
  *H04W 4/50* (2018.01)

(58) Field of Classification Search
  USPC ......... 455/456.1, 456.2, 456.3, 422.1, 414.1, 455/414.2, 414.3
  See application file for complete search history.

(56) References Cited

U.S. PATENT DOCUMENTS

| | | | |
|---|---|---|---|
| 8,326,315 | B2 | 12/2012 | Phillips et al. |
| 8,750,895 | B2 | 6/2014 | Grosman et al. |
| 8,755,824 | B1 | 6/2014 | Wang et al. |
| 9,451,403 | B2 | 9/2016 | Lyman et al. |
| 9,681,253 | B2 | 6/2017 | Lyman et al. |
| 10,117,041 | B2 | 10/2018 | Lyman et al. |
| 10,334,396 | B2 | 6/2019 | Lyman et al. |
| 10,516,966 | B2 | 12/2019 | Lyman et al. |
| 10,785,596 | B2 | 9/2020 | Lyman et al. |
| 2004/0235464 | A1 | 11/2004 | Korkalo et al. |
| 2007/0038761 | A1 | 2/2007 | Tebeka |
| 2009/0167529 | A1 | 7/2009 | Kashi |
| 2009/0222358 | A1 | 9/2009 | Bednarek |
| 2010/0262554 | A1 | 10/2010 | Elliott |
| 2010/0291950 | A1 | 11/2010 | Lin et al. |
| 2011/0208797 | A1 | 8/2011 | Kim |
| 2011/0217968 | A1 | 9/2011 | Korkalo et al. |
| 2011/0256881 | A1 | 10/2011 | Huang et al. |
| 2012/0022965 | A1 | 1/2012 | Seergy |
| 2012/0246003 | A1 | 9/2012 | Hart et al. |
| 2013/0203445 | A1 | 8/2013 | Grainger et al. |
| 2013/0231137 | A1 | 9/2013 | Hugie et al. |
| 2013/0295970 | A1 | 11/2013 | Sheshadri et al. |
| 2013/0331128 | A1 | 12/2013 | Qiu |
| 2014/0057648 | A1 | 2/2014 | Lyman et al. |
| 2014/0066101 | A1 | 3/2014 | Lyman et al. |
| 2014/0135039 | A1 | 5/2014 | Sartipi et al. |
| 2016/0360338 | A1 | 12/2016 | Lyman et al. |
| 2017/0280271 | A1 | 9/2017 | Lyman et al. |
| 2019/0028835 | A1 | 1/2019 | Lyman et al. |
| 2019/0261128 | A1 | 8/2019 | Lyman et al. |
| 2020/0037101 | A1 | 1/2020 | Lyman et al. |

FOREIGN PATENT DOCUMENTS

| | | |
|---|---|---|
| CN | 101419752 A | 4/2009 |
| CN | 101848416 A | 9/2010 |
| CN | 101895816 A | 11/2010 |
| CN | 102132588 A | 7/2011 |
| CN | 102196606 A | 9/2011 |
| CN | 102404680 A | 4/2012 |
| CN | 102457804 A | 5/2012 |
| CN | 104584508 A | 4/2015 |
| CN | 108668229 A | 10/2018 |
| CN | 109167825 A | 1/2019 |
| EP | 3550797 A2 | 10/2019 |
| KR | 10-2010-0121878 A | 11/2010 |
| WO | 2014/036296 A1 | 3/2014 |

OTHER PUBLICATIONS

Office Action received for Chinese Patent Application No. 201380045296.2, dated Dec. 18, 2017, 10 pages (5 pages of English Translation and 5 pages of Official Copy).
Office Action received for Chinese Patent Application No. 201380045296.2, dated Nov. 2, 2016, 14 pages.
Response to Office Action filed on Dec. 19, 2016 for Canadian Patent Application No. 2,881,660, dated Jun. 21, 2016, 16 pages.
First Examination Report received for Australian Patent Application No. 2013308666, dated Sep. 23, 2015, 4 pages.
Response to First Examination Report filed on Feb. 12, 2016 for Australian Patent Application No. 2013308666, dated Sep. 23, 2015, 21 pages.
Communication Pursuant to Article 94(3) EPC received for European Patent Application No. 19176150.1, dated Oct. 23, 2020, 9 pages.
Office Action received for Chinese Patent Application No. 201810951081.1 dated Dec. 9, 2020, 5 pages. (Official Copy Only).
U.S. Appl. No. 16/595,989, filed Oct. 8, 2019, Issued.
U.S. Appl. No. 16/399,781, filed Apr. 30, 2019, Issued.
U.S. Appl. No. 16/138,585, filed Sep. 21, 2018, Issued.
U.S. Appl. No. 15/620,132, filed Jun. 12, 2017, Issued.
U.S. Appl. No. 15/240,375, filed Aug. 18, 2016, Issued.
U.S. Appl. No. 13/958,340, filed Aug. 2, 2013, Issued.
Amendment After Notice of Allowance Under 37 CFR filed on Jun. 30, 2020 U.S. Appl. No. 16/595,989, 8 pages.
Applicant Initiated Interview Summary Received for U.S. Appl. No. 16/595,989, dated May 19, 2020, 3 Pages.
Non Final Office Action Received for U.S. Appl. No. 16/595,989, dated Mar. 31, 2020, 12 pages.
Notice of Allowance received for U.S. Appl. No. 16/595,989, dated Jun. 12, 2020, 6 pages.
PTO Response to rule 312 Communication Received for U.S. Appl. No. 16/595,989, dated Aug. 11, 2020, 2 pages.
Response to Non-Final Office Action filed on May 20, 2020 for U.S. Appl. No. 16/595,989, dated Mar. 31, 2020, 12 pages.
Response to Rule 312 Communication Received for U.S. Appl. No. 16/595,989, dated Jul. 14, 2020, 2 pages.
Updated Amendment After Notice of Allowance Under 37 CFR filed on Jul. 9, 2020 for U.S. Appl. No. 16/595,989, 7 pages.
Response to Office Action Filed on Jul. 31, 2020, for Chinese Patent Application No. 201810951044.0,dated Mar. 20, 2020, 12 pages(8 pages of Official Copy & 4 pages of English Translation of Claims ).
Office Action Received for Chinese Patent Application No. 201810951081.1, dated Sep. 15, 2020, 6 pages.
Notice of Allowance received for Korean Patent Application No. 10-2015-7007973, dated Jun. 28, 2016, 3 pages (1 page of English Translation and 2 pages of Official Copy).
Office Action received for Korean Patent Application No. 10-2015-7007973, dated Mar. 28, 2016, 10 pages (5 pages of English Translation and 5 pages of Official Copy).
Response to Office Action filed on May 27, 2016 for Korean Patent Application No. 10-2015-7007973, dated Mar. 28, 2016, 42 pages (37 pages of Official Copy and 5 pages of English Claims).
Notice of Allowance received for Korean Patent Application No. 10-2016-7026344, dated Feb. 10, 2017, 3 pages (1 page of English Translation and 2 pages of Official Copy).
Office Action received for Korean Patent Application No. 10-2016-7026344, dated Oct. 12, 2016, 6 pages (3 pages of English Translation and 3 pages of Official Copy).
Response to Office Action filed on Dec. 9, 2016 for Korean Patent Application No. 10-2016-7026344, dated Oct. 12, 2016, 13 pages ( 10 pages o Official Copy and 3 pages of English Claims).
Notice of Allowance received for Korean Patent Application No. 10-2017-7010189, dated Nov. 14, 2017, 3 pages (1 page of English Translation and 2 pages of Official Copy).

(56) References Cited

OTHER PUBLICATIONS

Office Action received for Korean Patent Application No. 10-2017-7010189, dated May 11, 2017, 4 pages (2 pages of English Translation and 2 pages of Official Copy).
Response to Office Action filed on Jul. 11, 2017 for Korean Patent Application No. 10-2017-7010189, dated May 11, 2017, 13 pages (8 pages of Official Copy and 5 pages of English Claims).
Notice of Allowance Received for Korean Patent Application No. 10-2018-7004263, dated Mar. 14, 2018, 3 pages (1 page of English Translation and 2 pages of Official Copy).
Final Office Action received for U.S. Appl. No. 13/958,340, dated May 8, 2015, 8 pages.
Non-Final Office Action received for U.S. Appl. No. 13/958,340, dated Oct. 8, 2014, 8 pages.
Non-Final Office Action received for U.S. Appl. No. 13/958,340, dated Sep. 11, 2015, 8 pages.
Notice of Allowability received for U.S. Appl. No. 13/958,340, dated Feb. 19, 2016, 2 pages.
Notice of Allowance received for U.S. Appl. No. 13/958,340, dated Jan. 29, 2016, 5 pages.
Notice of Allowance received for U.S. Appl. No. 13/958,340, dated May 11, 2016, 5 pages.
Response to Final Office Action filed on Aug. 10, 2015 for U.S. Appl. No. 13/958,340, dated May 8, 2015, 11 pages.
Response to Non-Final Office Action filed on Jan. 8, 2015 for U.S. Appl. No. 13/958,340, dated Oct. 8, 2014, 12 pages.
Response to Non-Final Office Action filed on Jan. 11, 2016 for U.S. Appl. No. 13/958,340, dated Sep. 11, 2015, 13 pages.
Article 94(3) EPC received for European Patent Application No. 13762948.1 dated Dec. 5, 2017, 7 pages.
International Written Opinion received for PCT Application No. PCT/US2013/057349, dated Oct. 17, 2013, 4 pages.
Office Action received for European Patent Application No. 13762948.1, dated Jul. 12, 2017, 9 pages.
Response to the communication pursuant to Article 94(3) EPC filed on Mar. 28, 2018 for European Patent Application No. 13762948.1 dated Dec. 5, 2017, 7 pages.
Response to the communication pursuant to Article 94(3) EPC filed on Nov. 7, 2017 for European Patent Application No. 13762948.1 dated Jul. 12, 2017, 11 pages.
Non-Final Office Action received for U.S. Appl. No. 15/240,375, dated Sep. 23, 2016, 9 pages.
Notice of Allowance received for U.S. Appl. No. 15/240,375, dated Feb. 8, 2017, 8 pages.
Response to Non-Final Office Action filed on Dec. 21, 2016 for U.S. Appl. No. 15/240,375, dated Sep. 23, 2016, 16 pages.
Final Office Action received for U.S. Appl. No. 15/620,132, dated Oct. 16, 2017, 5 pages.
Non-Final Office Action received for U.S. Appl. No. 15/620,132, dated Feb. 23, 2018, 6 pages.
Non-Final Office Action received for U.S. Appl. No. 15/620,132, dated Jun. 29, 2017, 6 pages.
Notice of Allowance received for U.S. Appl. No. 15/620,132, dated Jun. 28, 2018, 5 pages.
Response to Final Office Action filed on Jan. 16, 2018 for U.S. Appl. No. 15/620,132, dated Oct. 16, 2017, 9 pages.
Response to Non-Final Office Action filed on May 23, 2018, for U.S. Appl. No. 15/620,132, dated Feb. 23, 2018, 12 pages.
Response to Non-Final Office Action filed on Sep. 29, 2017 for U.S. Appl. No. 15/620,132, dated Jun. 29, 2017, 8 pages.
Non-Final Office Action received for U.S. Appl. No. 16/138,585, dated Jan. 2, 2019, 6 pages.
Notice of Allowance received for U.S. Appl. No. 16/138,585, dated Feb. 11, 2019, 5 pages.
Response to Non-Final Office Action filed on Jan. 22, 2019, for U.S. Appl. No. 16/138,585, dated Jan. 2, 2019, 13 pages.
Non-Final Office Action received for U.S. Appl. No. 16/399,781, dated Jun. 17, 2019, 6 pages.
Notice of Allowance received for U.S. Appl. No. 16/399,781 dated Aug. 16, 2019, 5 pages.
Response to Non-Final Office Action filed on Aug. 1, 2019 for U.S. Appl. No. 16/399,781, dated Jun. 17, 2019, 9 pages.
Response to Extended European Search Report Filed on Mar. 31, 2020, for European Patent Application No. 19176150.1, dated Dec. 12, 2019, 14 pages.
Office Action received for Canadian Patent Application No. 2,881,660, dated Jun. 21, 2016, 2 pages.
International Search Report received for PCT Application No. PCT/US2013/057349, dated Oct. 17, 2013, 4 pages.
International Preliminary Report on Patentability received for PCT Application No. PCT/US2013/057349, dated Mar. 12, 2015, 6 pages.
Office Action Received for Chinese Patent Application No. 201810951044.0, dated Mar. 20, 2020, 13 pages (6 pages of Official Copy and 7 pages of English Translation).
Response to Office Action Filed on Sep. 11, 2017 for Chinese Patent Application No. 201380045296.2 dated Jun. 27, 2017, 8 pages (5 pages of Official Copy and 3 pages of English Pending Claims).
Response to Office Action filed on Mar. 15, 2017 for Chinese Patent Application No. 201380045296.2, dated Nov. 2, 2016, 9 pages (7 pages of Official Copy and 2 pages of Pending Claims).
Response to Office Action filed on Feb. 28, 2018 for Chinese Patent Application No. 201380045296.2, dated Dec. 18, 2017, 8 pages (6 pages of Official Copy and 2 pages of English Claims).
Extended European Search Report Received for European Patent Application No. 19176150.1, dated Dec. 12, 2019, 10 pages.
Partial European Search Report Received for European Patent Application No. 19176150.1, dated Aug. 21, 2019, 15 pages.

CONFIGURING MOBILE DEVICE APPLICATIONS BASED ON LOCATION

RELATED APPLICATIONS

This application is a continuation of and claims priority to U.S. patent application Ser. No. 16/595,989, filed Oct. 8, 2019, which claims priority under 35 U.S.C. § 120 U.S. patent application Ser. No. 16/399,781, filed Apr. 30, 2019, which claims priority under 35 U.S.C. § 120 to U.S. patent application Ser. No. 16/138,585, filed Sep. 21, 2018, which claims priority under 35 U.S.C. § 120 to U.S. patent application Ser. No. 15/620,132, filed Jun. 12, 2017, which claims priority under 35 U.S.C. § 120 to U.S. patent application Ser. No. 15/240,375, filed on Aug. 18, 2016, which claims priority under 35 U.S.C. § 120 to U.S. patent application Ser. No. 13/958,340, filed on Aug. 2, 2013, which claims priority to U.S. Provisional Application Ser. No. 61/695,196, filed on Aug. 30, 2012, the disclosures of which are incorporated by reference herein in their entirety.

BACKGROUND

The ever-increasing use of smart phones, such as the iPhone® (from Apple, Inc. of Cupertino Calif.), with data connections and location determination capabilities is slowly changing the way people interact, shop for products and services, and even manage accounts. Smart phones can provide users with nearly instant information regarding a wide range of information, such as product availability, friend locations, or pricing. For example, applications such as RedLaser™ (from eBay, Inc. of San Jose, Calif.) allow a smart phone user to scan a bar code and instantly check prices across online and local retail outlets. Smart phones also commonly include mechanisms, such as global positioning system (GPS) receivers, that allow the devices to constantly update location information. These technology changes are also driving changes in the way people wish to interact with mobile devices within different contextual locations (e.g., retail stores, at home, or at school).

BRIEF DESCRIPTION OF THE DRAWINGS

Some embodiments are illustrated by way of example and not limitation in the figures of the accompanying drawings in which.

DEFINITIONS

Figure 1:
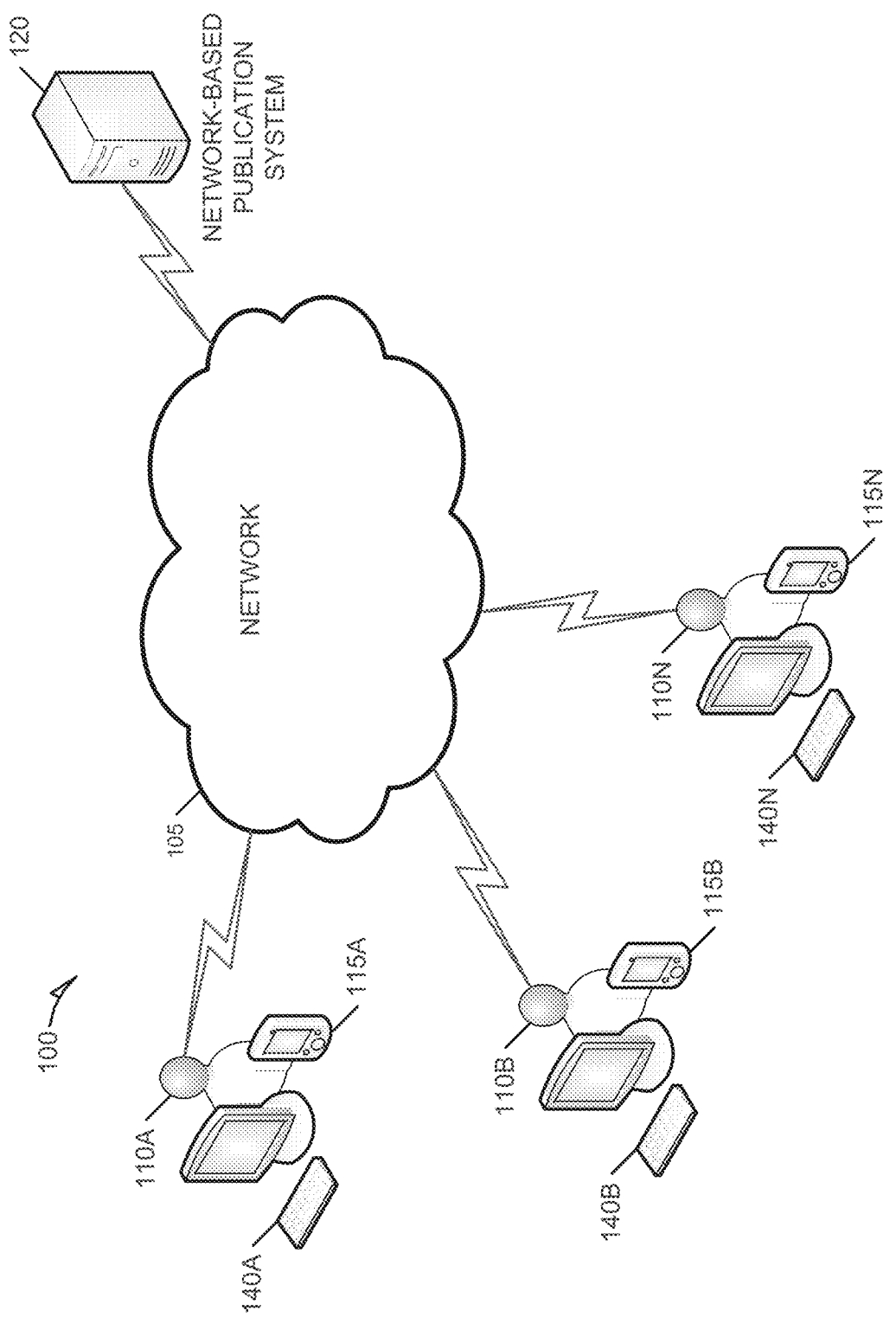
FIG. 1 is a block diagram depicting a system for enabling contextual in-store experience modifications on a mobile device, according to an example embodiment.

Location—For the purposes of this specification and the associated claims, the term "location" is used to refer to a geographic location, such as a longitude/latitude combination or a street address. The term "location" is also used within this specification in reference to a physical location associated with an event, such as a vacation destination.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Context—For the purposes of this specification and the associated claims, the term "context" is used to refer to environmental inputs, such as location, time, and weather conditions, among others. The context generally refers to conditions describing an individual's (e.g., user's) environment and/or activities. For example, context information can include a user's location, direction of movement, current activity (e.g., working, driving, playing golf, shopping, etc.), current weather conditions, time of day, and time of year (e.g., season), among other things. In certain examples, context information about a user can also include past events, purchase history, or other historical data about the user. In the following examples, context can alter how a particular mobile device (e.g., smart phone) application operates on a particular mobile device. For example, a mobile shopping application may enter different modes depending upon location. In this example, if the user of the mobile device is at home the mobile shopping application may default to creation of a shopping list. In contrast, if the user of the mobile device is in a grocery store, the mobile shopping application can enter a grocery shopping mode displaying a repetitive grocery list. In yet another retail location, such as an electronics store, the mobile shopping application can enter a price comparison mode or access a wish list

DETAILED DESCRIPTION

Example systems and methods for using contextual in-store experience modifications on a mobile device are described, among other things. Also described are systems and methods for generating and utilizing geofence enabled mobile application configurations on a mobile device. In some example embodiments, the systems and methods for enabling contextual in-store experience modifications on a mobile device allow a mobile device to seamlessly alter the functionality of a mobile application based on location context, among other things. In the following description, for purposes of explanation, numerous specific details are set forth in order to provide a thorough understanding of example embodiments. It will be evident, however, to one skilled in the art, that various implementations may be practiced without these specific details. It will also be evident that contextual in-store experience on a mobile device is not limited to the examples provided and may include other scenarios not specifically discussed.

Geofences can be used on a location-aware mobile device to detect when a user of the mobile device enters a specific location, such as a specific retail store. Geofences can be defined in terms of Global Positioning System (GPS) coordinates (e.g., latitude and longitude) combined with a radius measured in meters or feet, for example. Alternatively, geofences can also be defined according a series of GPS coordinates defining a bounding box. In yet other examples, a geofence can be any geometric shape defined by a mathematical formula and anchored by a GPS coordinate. In certain examples, location data points can also be used to detect movement trajectories, which can be used to refine detection of presence within geofences representing a physical location (e.g., retail store, user's residence, etc. . . . ).

Using the concept of geofences or another means of location monitoring, a mobile device can monitor location and signal a mobile application to change configuration based at least in part upon the current location of the device. For example, RedLaser (from eBay, Inc. of San Jose, Calif.) is a mobile shopping application that allows users to scan products and obtain pricing and other product information. The functionality that automatically occurs when a user scans a product (e.g., a bar code, Quick Response (QR) code, or similar 2D matrix codes) can be modified based on the current location of the mobile device. If the mobile device is located within a retail location, the product scan can result in price comparison between the current location and online options, for example. Alternatively, if the mobile device is located within the user's residence, scanning a product may bring up promotional materials or a user guide for the product. In yet other examples, scanning a product may result in adding that product to a shopping list or online wish list. In some examples, the mobile application can include user configurable options for default responses within various locations, such as home, work, or individual retail stores (e.g., electronics store versus grocery store), among others. For example, scanning a QR or bar code while in a grocery store can result in checking the product off on a shopping list as purchased. The mobile application can also provide information on a current location, such as store hours, address, phone number, return policies, price match policy, or top selling products, among others.

Mobile applications, such as RedLaser, can also be configured to send notifications customized to a particular location. The notifications can be triggered when the mobile device (or a central monitoring service) detects that the mobile device has entered a particular location. For example, upon entering a particular electronics retailer location, the mobile application can provide offers, deals, inventory information, or store layout maps tailored to that particular location. This information may allow the mobile device user quicker access to the desired product or incent purchase of desired items. In some examples, the mobile application can interact with a network-based publishing system that can be configured to send personalized notifications and offers customized for the individual user and the current location. For example, a mobile device user may maintain some sort of online wish list (or similar user profile information on desired products and services), the online wish list can be matched against a retail location's current inventory and offers to produce a customized notification regarding opportunities for the mobile device user to make a purchase of an item on the wish list.

Mobile devices, such as an iPhone® (from Apple, Inc. of Cupertino, Calif.) or a device running Android™ (from Google, Inc. of Mountain View, Calif.), can often only monitor a limited number of geofences at a given time. Additionally, applications running on a mobile device commonly can only update monitored geofences when the application is opened by a user (or at least active in memory on the mobile device).

In order to overcome the limitation of only being able to monitor a limited number of geofences, a concept of geofence paging has been developed. Geofence paging can also provide a benefit of limiting the amount of memory utilized within a mobile device for monitoring and maintaining geofences. For example, a mobile device operating according to an embodiment can monitor 10 geofences at any given time (please note, 10 is an arbitrary number and is not intended to limit the systems and methods disclosed herein). Nine of the monitored geofences are assigned to specific geographical locations of interest (e.g., a retail store), while the $10^{th}$ geofence geographically encircles the other nine. In some examples, the nine smaller geofences are referred to as child geofences with the large encompassing geofence referred to as a parent geofence. In yet other examples, the 10 geofences may be referred to as a page of geofences, with the large geofence describing the boundaries of the page and the smaller geofences located within the page. The concept of geofence paging (or parent/child geofence groups) is further discussed in a co-pending application titled "Passive Dynamic Geofencing for Mobile Devices," by inventors Nate Lyman and Frank Russo, filed on Aug. 22, 2012, Application Ser. No. 61/692,173. The Passive Dynamic Geofencing for Mobile Devices application is hereby incorporated by reference in its entirety.

Example System

FIG. 1 is a block diagram depicting a system 100 for enabling contextual in-store experience modifications on a mobile device, according to an example embodiment. In an example, system 100 can include users 110A-110N (collectively referred to as either user 110 or users 110 depending upon context) and a network-based publication system 120. In an example, the users 110A-110N can connect to the network-based publication system 120 via mobile devices 115A-115N (collectively referred to as mobile device 115). Users 110A-110N can also connect to the network-based publication system 120 via clients 140A-140N (collectively referred to as client 140 or clients 140).

In an example, the users 110 can configure an account on the network-based publication system 120. The account can be accessed by each user, such as user 110A, using mobile device 115A or client 140A, if user 110A meets the specified access criteria or rules. In an example, the access rules can include user identification and location identification rules (e.g., user is located within a location supported by the network-based publication system 120). A user account on the network-based publication system 120 can allow the user to define specific locations of interest for monitoring via geofences. In some examples, the network-based publication system 120 can monitor user behavior and create geofences based on past and predicted user behaviors. In certain examples, the network-based publication system 120 can be used by merchants as a location-based advertising platform, where users, such as users 110, opt-in to location-based advertisements. For example, a national electronics retailer may use the network-based publication system 120 to provide location-based advertising to users 110 via mobile devices 115. In this example, a series of parent geofences may be generated, each encompassing a manageable number of geographically related retail locations. Each of the electronics store locations would be covered by a much smaller child geofence that enables the network-based publication system 120 to serve location-based advertising relevant to the specific electronic retailer store location only when one of the users 110 is in geographic proximity to the store (based on the mobile device 115 detecting a location within one of the monitored child geofences).

In other examples, either the mobile device, such as mobile device 115, or the network-based publication network 120 can re-configure a mobile application based on entry into a child geofence (or via other location-based determination and triggering mechanism).

Example Operating Environment

Figure 2:
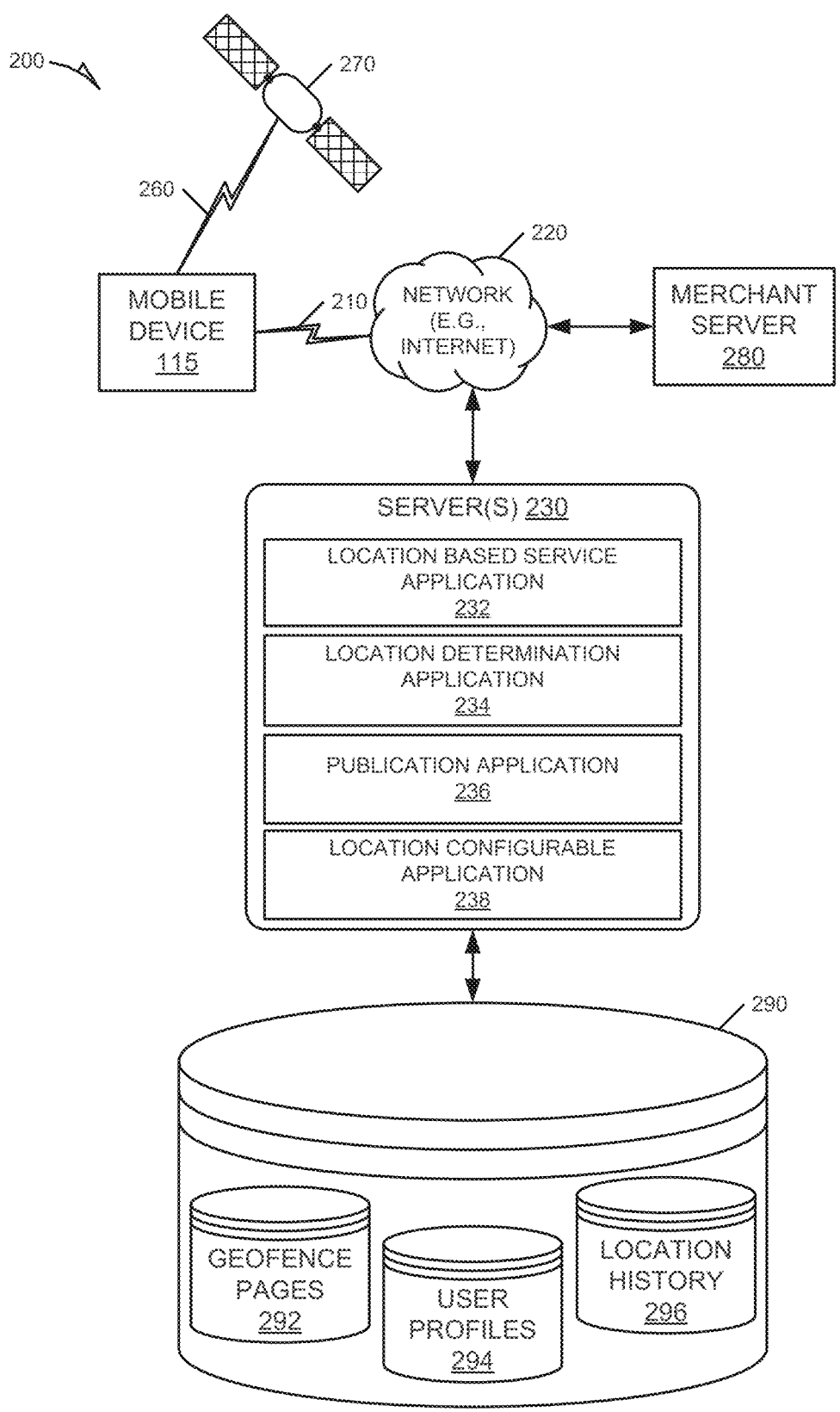
FIG. 2 is a block diagram illustrating an environment for operating a mobile device, according to an example embodiment.

FIG. 2 is a block diagram illustrating an environment 200 for operating a mobile device 115, according to an example embodiment. The environment 200 is an example environment within which methods for implementing contextual in-store experience modifications can operate. The environment 200 can include a mobile device 115, a communication connection 210, a network 220, servers 230, a wireless communication connection 260, a communication satellite 270, a merchant server 280, and a database 290. The servers 230 can optionally include location based service application 232, location determination application 234, publication application 236, and location configurable application 238. The database 290 can optionally include geofence pages 292, user profiles 294, and/or location history 296. The mobile device 115 represents one example device that can be utilized by a user to monitor current location and alter mobile device application behavior, such as location configurable application 238. The mobile device 115 may be any of a variety of types of devices (for example, a cellular telephone, a Personal Digital Assistant (PDA), a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 232, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 232 can provide location data to a network-based publication system 120, which can then be used to provide access to a group account on the network-based publication system 120. Knowledge of the device's location, and/or the location of other devices, may be obtained through interoperation of the mobile device 115 with a location determination application 234 executing on one or more of the servers 230. Location information may also be provided by the mobile device 115, without use of a location determination application, such as application 234. In certain examples, the mobile device 115 may have some limited location determination capabilities that are augmented by the location determination application 234. In some examples, the servers 230 can also include publication application 236 for providing location-aware publication of data such as advertisements or offers. In certain examples, location data can be provided to the publication application 236 by the location determination application 234. In some examples, the location data provided by the location determination application 234 can include merchant information (e.g., identification of a retail location). In certain examples, the location determination application 234 can receive signals via the network 220 to further identify a location. For example, a merchant may broadcast a specific IEEE 802.11 service set identifier (SSID) that can be interpreted by the location determination application 234 to identify a particular retail location. In another example, the merchant may broadcast an identification signal via radio-frequency identification (RFID), near-field communication (NFC), or a similar protocol that can be used by the location determination application 234. In addition to examples using these various mechanisms to identify a particular location, these mechanisms (e.g., SSIDs, RFIDs, NFC, and so forth) can be used as secondary authentication factors, which are discussed in more detail below.

In certain examples, the location configurable application 238 can leverage the LBS application 232 or the location determination application 234 to assist in determining device location and proper location-based configuration to apply.

Example Mobile Device

Figure 3:
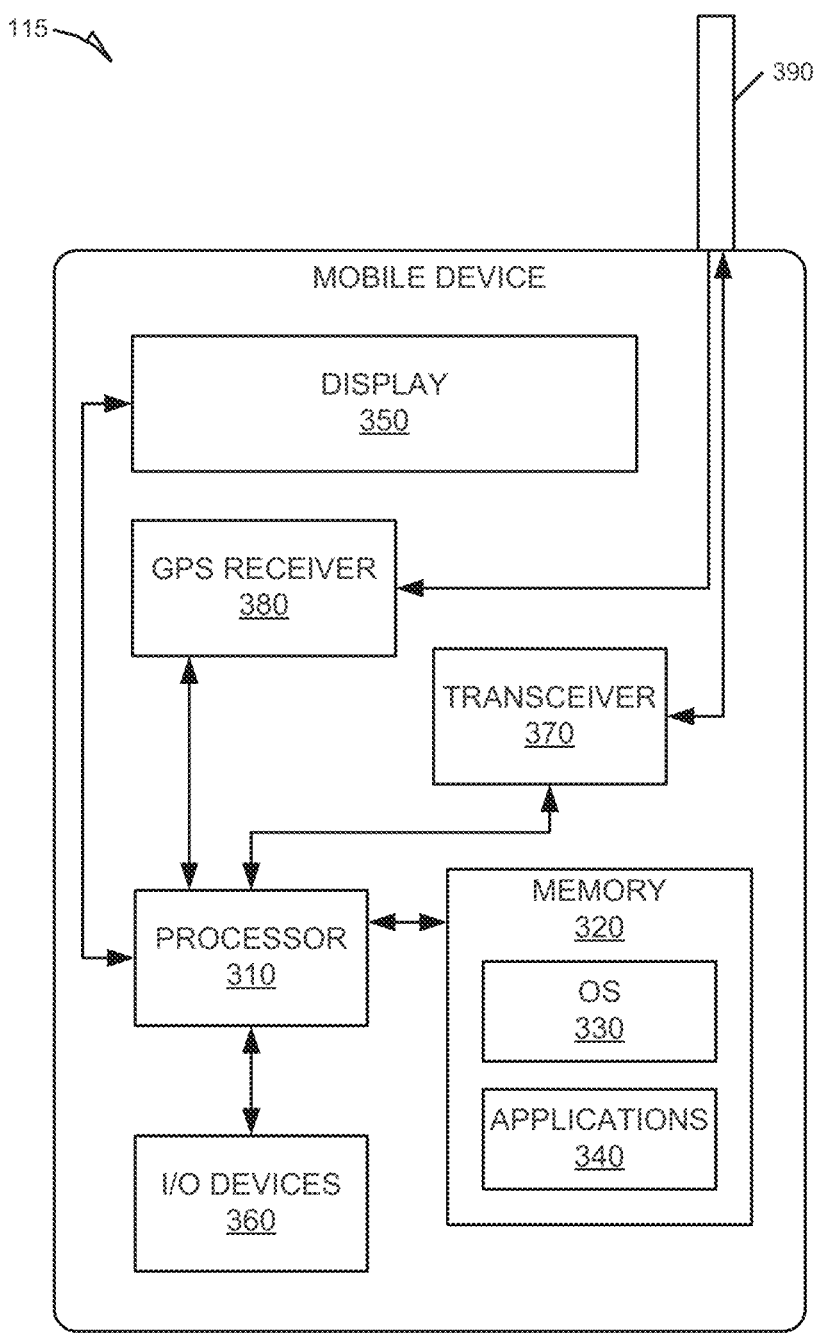
FIG. 3 is a block diagram illustrating the mobile device, according to an example embodiment.

FIG. 3 is a block diagram illustrating the mobile device 115, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor 310. The memory 320 may be adapted to store an operating system (OS) 330, as well as application programs 340, such as a mobile location enabled application that may provide LBSs to a user. In certain examples, the application programs 340 can include instructions to alter functional behavior based on location information. The processor 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

Additional detail regarding providing and receiving location-based services can be found in U.S. Pat. No. 7,848,765, titled "Location-Based Services," granted to Phillips et al. and assigned to eBay, Inc. of San Jose, Calif., which is hereby incorporated by reference.

An example geo-location concept discussed within U.S. Pat. No. 7,848,765 is a geofence. A geofence can be defined as a perimeter or boundary around a physical location or mobile object (e.g., a user). A geofence can be as simple as a radius around a physical location defining a circular region around the location. However, a geofence can be any geometric shape or an arbitrary boundary drawn on a map. A geofence can be used to determine a geographical area of interest for the calculation of demographics, advertising, or similar purposes. Geofences can be used in conjunction with the offer generation and delivery concepts discussed herein. For example, a geofence can be used to assist in determining whether a user (or mobile device associated with the user) is within a geographic area of interest (e.g., target location) to providing access to a group account. If the user is within a geofence established by provisioning of a group account, the systems discussed herein can use that information to authorize the user to access the group account, such as authorizing the user to process a payment against a group payment account.

Example Platform Architecture

Figure 4:
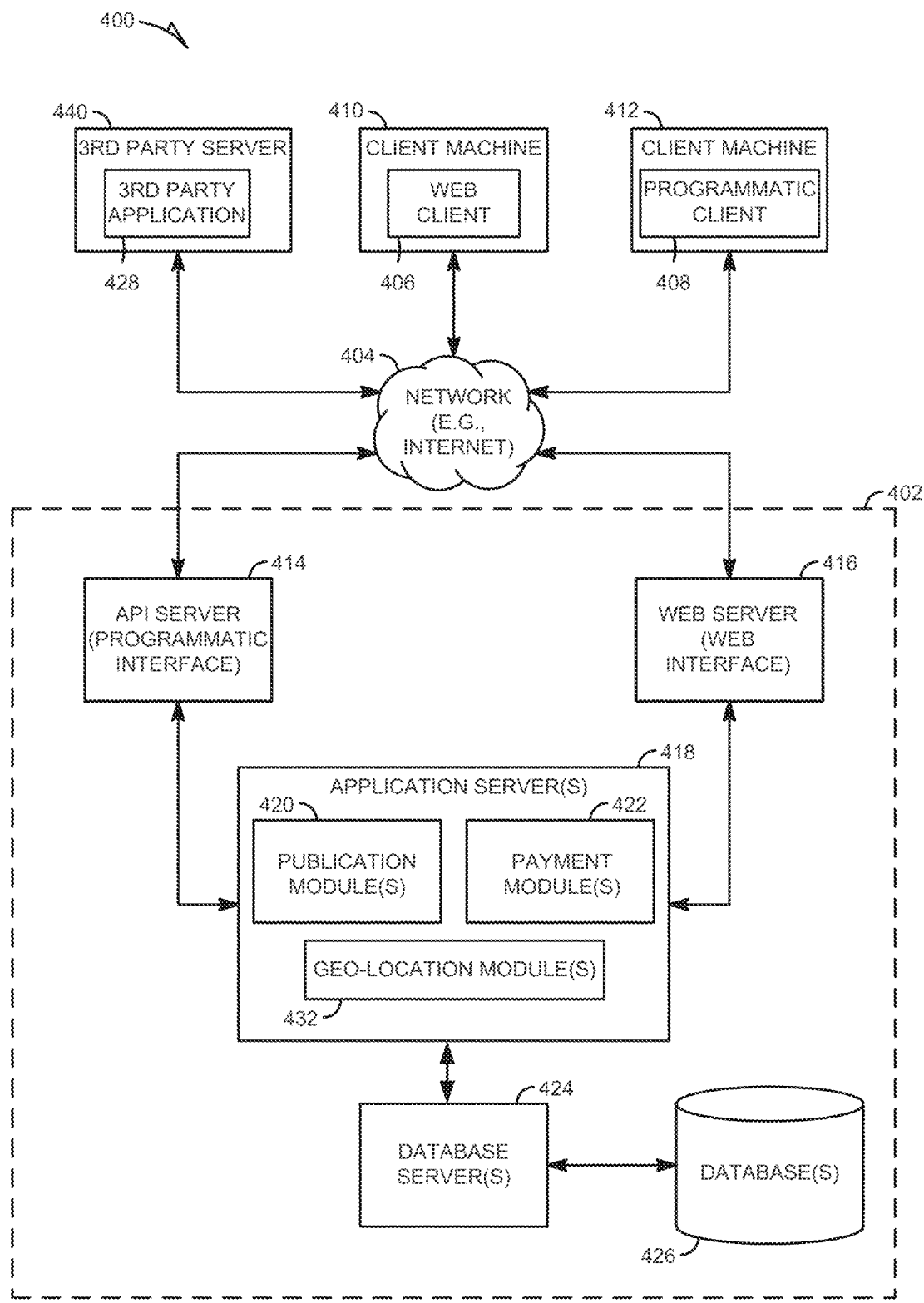
FIG. 4 is a block diagram illustrating a network-based system within which contextual in-store experience modifications can operate, according to an example embodiment.

FIG. 4 is a block diagram illustrating a network-based system 400 within which contextual in-store experience modifications can operate, according to an example embodiment. The block diagram depicts a network-based system 400 (in the exemplary form of a client-server system), within which an example embodiment can be deployed. A networked system 402 is shown, in the example form of a network-based location-aware publication or payment system, that provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Wash. State) and a programmatic client 408 (e.g., PAYPAL payments smart phone application from PayPal, Inc. of San Jose Calif.) executing on respective client machines 410 and 412. In an example, the client machines 410 and 412 can be in the form of a mobile device, such as mobile device 115. In yet another example, the programmatic client 408 can be the RedLaser mobile shopping application from eBay, Inc. of San Jose, Calif.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and geo-location modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 can also be configured to facilitate payment processing based on geofence detection and work in conjunction with the geo-location modules 432. The geo-location modules 432 may provide determination of current location, among other things. While the publication modules 420, payment modules 422, and geo-location modules 432 are shown in FIG. 4 to all form part of the networked system 402, it will be appreciated that, in alternative embodiments, the payment modules 422 may form part of a payment service that is separate and distinct from the networked system 402.

Further, while the system 400 shown in FIG. 4 employs a client-server architecture, the various implementations are not limited to such an architecture, and could equally well find application in a distributed, or peer-to-peer, architecture system, for example. The various publication modules 420, payment modules 422, and authorization modules 432 could also be implemented as standalone systems or software programs, which do not necessarily have networking capabilities.

The web client 406 accesses the various publication modules 420, payment modules 422, and geo-location modules 432 via the web interface supported by the web server 416. Similarly, the programmatic client 408 accesses the various services and functions provided by the publication modules 420, payment modules 422, and geo-location modules 432 via the programmatic interface provided by the API server 414. The programmatic client 408 may, for example, be a smart phone application (e.g., the PAYPAL payments application) that enables users to process payments directly from their smart phones leveraging user profile data and current location information provided by the smart phone or accessed over the network 404.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the geo-location modules 432 for advertising or marketing purposes.

Example Geo-Location Modules

Figure 5:
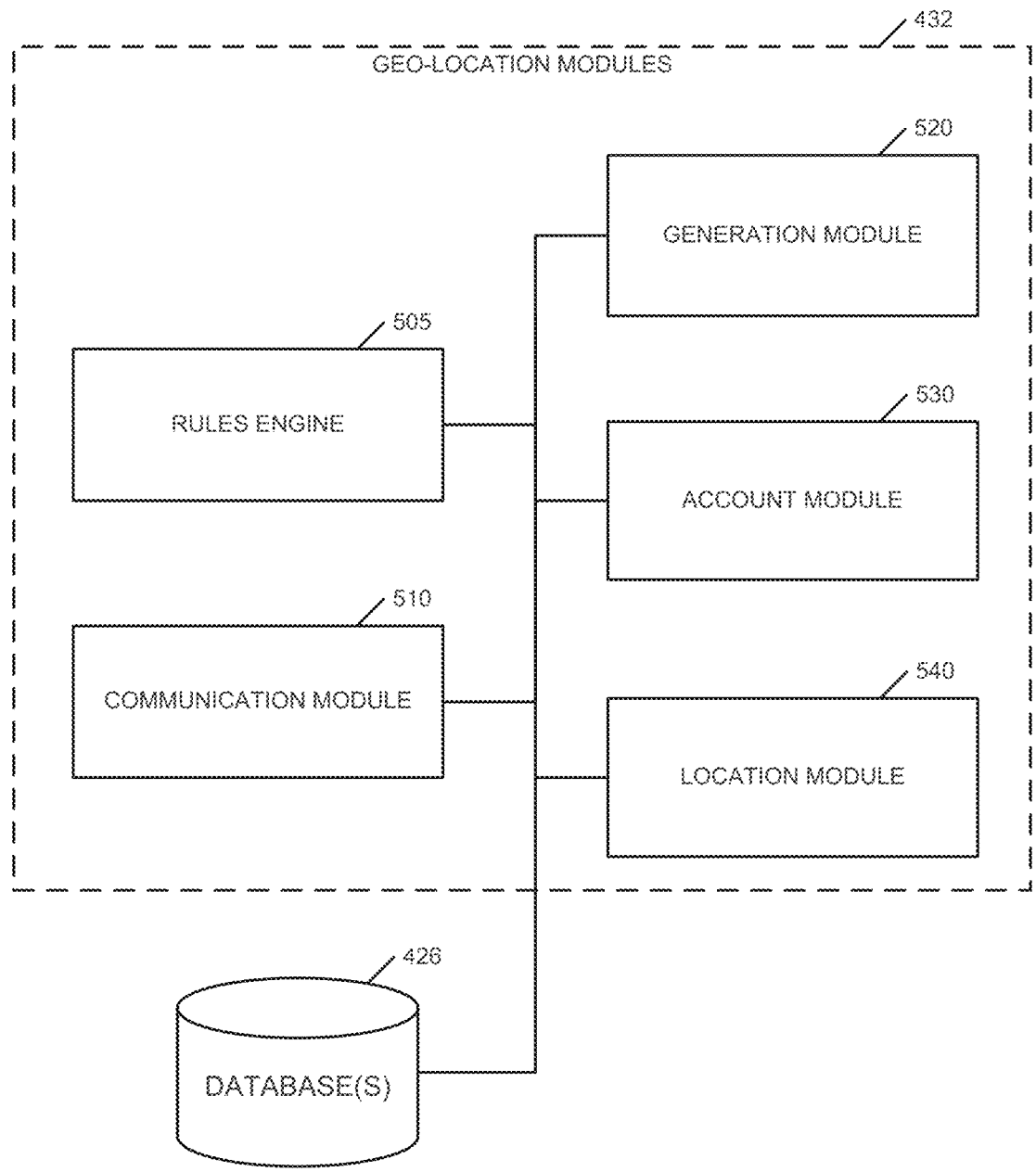
FIG. 5 is a block diagram illustrating geo-location modules, according to an example embodiment.

FIG. 5 is a block diagram illustrating geo-location modules 432, according to an example embodiment. In this example, the geo-location modules 432 can include a rules engine 505, a communication module 510, a generation module 520, an account module 530, and a location module 540. In an example, the geo-location modules 432 can access database 426 to store and/or retrieve generation rules, user profile data, location data, and geofences (parent and child), as well as other information, to enable contextual in-store experience modifications to a mobile application running on a mobile device.

In an example, the rules engine 505 can be configured to manage and evaluate rules controlling how one or more mobile applications can be configured in various locations or other contextual situations (e.g., weather, time of day, time of the year, etc. . . . ).

The communication mobile 510 can be configured to manage all communications involving the geo-location module 432. In an example, the communication module 510 can be configured to manage communications between the geo-location modules 432 and a user, where the user is communicating via the mobile device 115 or the client 140.

In an example, the generation module 520 is configured to generate mobile application configuration packages (e.g., files) according to information provided by modules, such as the account module 530, the location module 540 and the rules engine 505.

In an example, the account module 530 is configured to provision (setup) and manage a user account on the networked system 402. In certain examples, the account module 530 can provision a user account according to configuration data received by the communication module 510. The account module 530 can also work in conjunction with the rules engine 505 in provisioning or decommissioning user accounts.

In an example, the location module 540 is configured to receive location data from a mobile device, such as mobile device 115, and determine from the location data a current physical location, which may include reference to landmarks or other sites of interest. In some examples, the location module 540 can receive GPS-type coordinates (e.g., longitude and latitude), which can be used to establish a current location associated with a mobile device (and, thus, a user of the mobile device). Using the longitude and latitude coordinates, the location module 540 can determine if the current location is within a current parent geofence, for example. In certain examples, the location module 540 can receive other location determining information from a mobile device, such as a photograph or scan of data only readily available at a certain physical location (generally referred to as secondary location authentication factor). In another example, some merchants may broadcast specific wireless network signals that can be received by a mobile device, such as mobile device 115. Once received, the mobile device 115 can include programming or circuitry to translate the signal into a specific location, or the mobile device 115 can simply retransmit the unique signal to the location module 540. In an example, a merchant location can transmit a unique SSID, which the location module can be programmed to interpret as identifying a specific merchant location. In another example, the merchant may broadcast a unique SSID within all of its locations and the location module 540 can be programmed to use a combination of the unique SSID and other location data (e.g., GPS coordinates or cell tower locations) to identify a specific location. Further functionality that can be provided by the location module 540 is discussed in reference to FIG. 6 below.

Additional details regarding the functionality provided by the geo-location modules 432 are detailed in reference to FIGS. 6-8 below.

Example Geo-Location Trajectory Tracking

Figure 6:
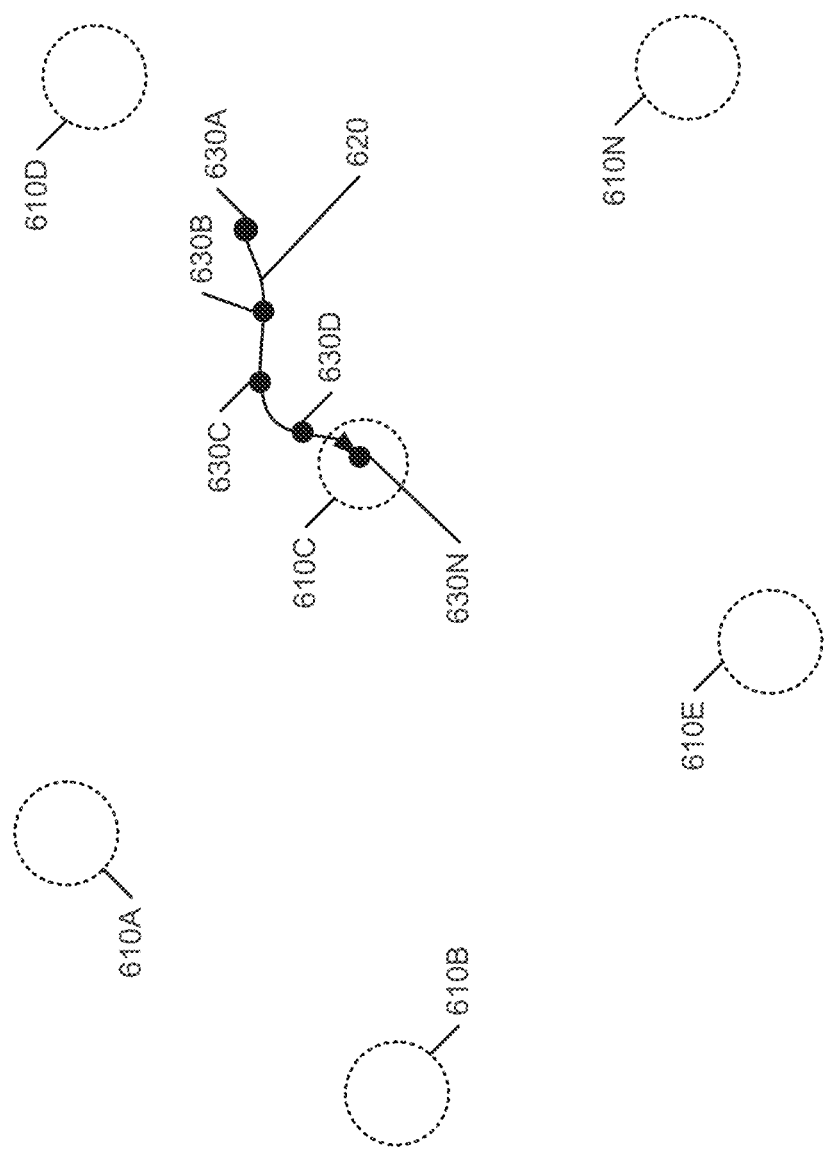
FIG. 6 is a block diagram illustrating example geofences and a mobile device trajectory associated with a particular geofence, according to an example embodiment.

FIG. 6 is a block diagram illustrating example geofences and a mobile device trajectory associated with a particular geofence, according to an example embodiment. In this example, geofences 610A through 610N (collectively referred to as geofence 610 or geofences 610 depending upon context) represent a series of monitored geofences. In certain examples, geofences 610 can represent a series of monitored physical locations, such as a chain of coffee shops or retail stores. Locations 630A through 630N (collectively referred to as locations 630) represent chronologically captured location data from a mobile device, such as mobile device 115. In an example, locations 630 can be analyzed to determine a trajectory 620 of mobile device 115, which can in turn be utilized to more accurately determine when the mobile device 115 actually enters a geofence, such as geofence 610C. Tracking a mobile device, such as mobile device 115, over time can provide more accurate location information than merely receiving a single location indicator from the mobile device 115. Additionally, using trajectories 620 can improve the ability to accurately determine when a mobile device actually enters a physical location, such as a retail store.

In some examples, location determination mechanisms can also use location averaging to improve the accuracy of location determination. For example, in addition to using trajectory tracking, the networked system 402 can also obtain multiple location data points from the mobile device 115 to further refine the location data used in subsequent processing. Similarly, the mobile device 115 itself can also use location averaging to refine the position reported out or used by mobile applications for other location-based services and processing.

Example Methods

Figure 7:
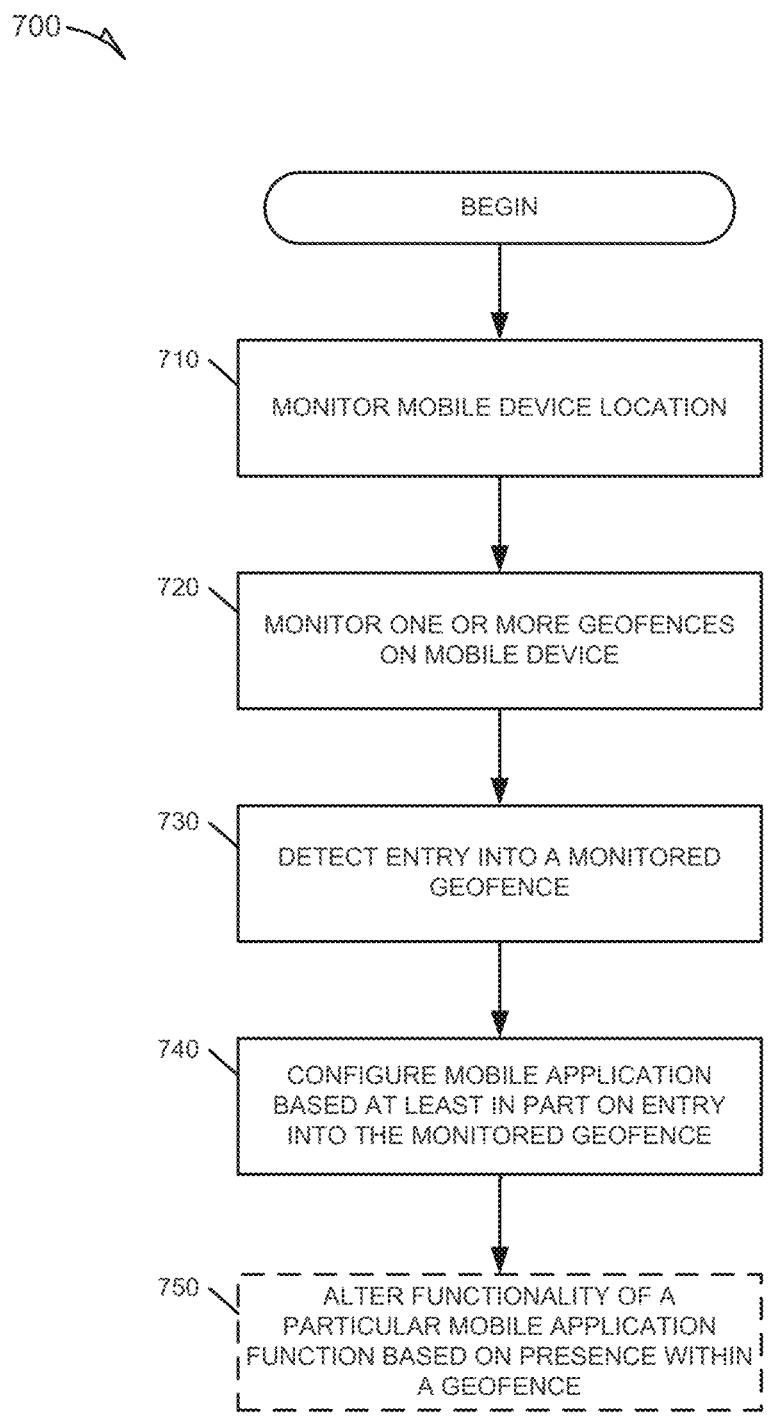
FIG. 7 is a flowchart illustrating a method for using contextual in-store experience modification on a mobile device, according to an example embodiment.

FIG. 7 is a flowchart illustrating a method 700 for using contextual in-store experience modification on a mobile device, according to an example embodiment. In an example, the method 700 can include operations for: monitoring mobile device location at 710, monitoring one or more geofences on a mobile device at 720, detecting entry into a monitored geofence at 730, configuring a mobile application based at least in part on entry into the monitored geofence at 740, and optionally altering functionality of a particular mobile application function based on presence within a geofence at 750.

In an example, the method 700 can begin at 710 with the mobile device 115 monitoring its current location. At 720, the method 700 can continue with the mobile device 115 monitoring one or more geofences in reference to the current location of the mobile device 115. At 730, the method 700 can continue with the mobile device 115 detecting entry into a monitored geofence. In an example, the mobile device 115 can detect entry into the monitored geofence including calculating a trajectory associated with the mobile device 115.

At 740, the method 700 can continue with the mobile device 115 configuring a mobile application based at least in part on entry into the monitored geofence. In an example, the mobile device 115 can select a mobile application configuration based on the entered geofence (e.g., physical location). In this example, each geofence (or type of geofence) can have a mobile application configuration associated with it. Finally, at 750, the method 700 can optionally include the mobile device 115 altering a specific individual function of a mobile application based on presence within a geofence (or physical location if determined through means other than geofencing).

Figure 8:
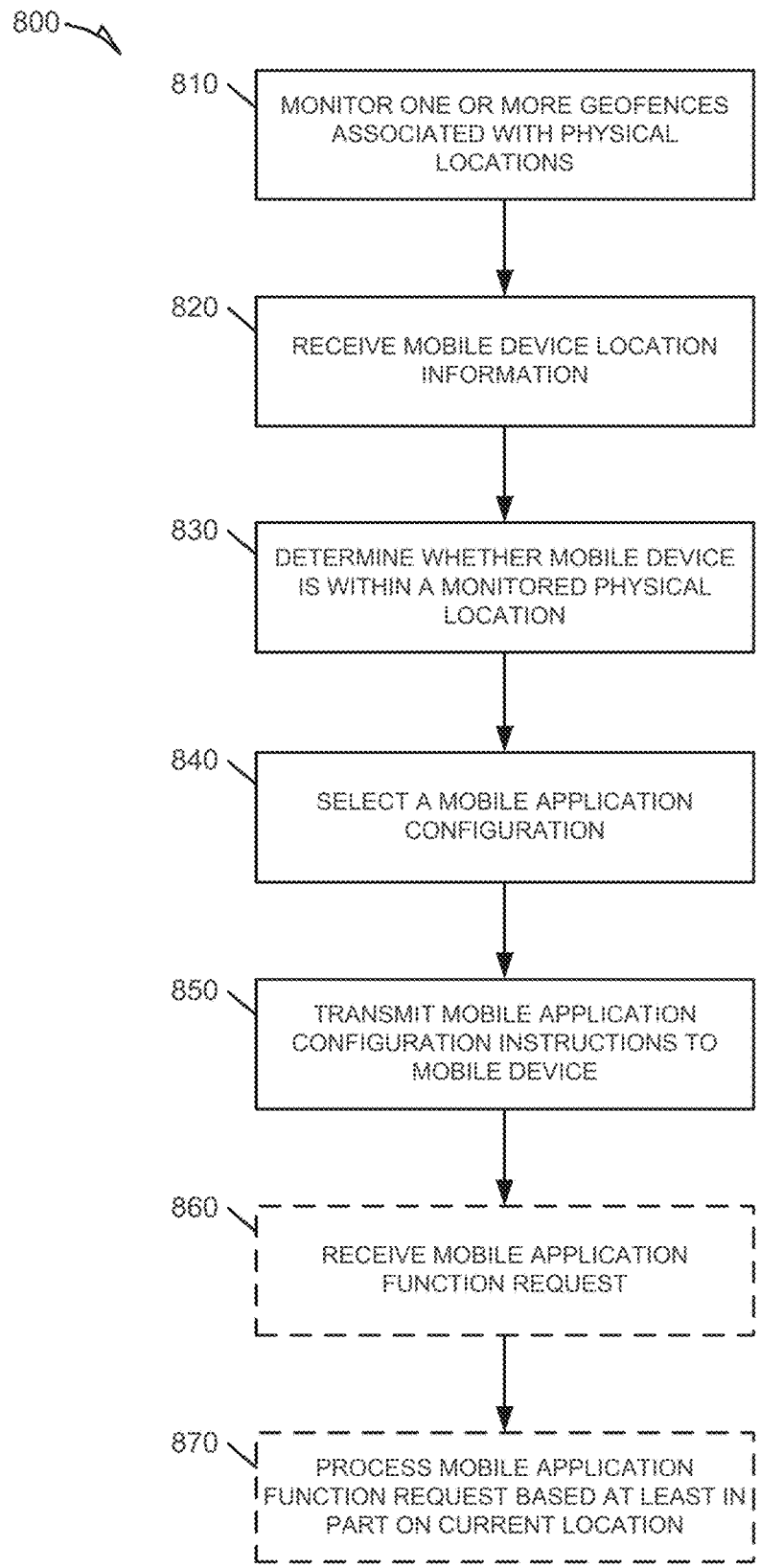
FIG. 8 is a flowchart illustrating a method of enabling contextual in-store experience modification on a mobile device, according to an example embodiment.

FIG. 8 is a flowchart illustrating a method 800 of enabling contextual in-store experience modification on a mobile device, according to an example embodiment. In an example, the method 800 can include operations for: monitoring geofences associated with physical locations at 810, receiving mobile device location data at 820, determining whether the mobile device is within a location at 830, selecting a mobile application configuration at 840, and transmitting a mobile application configuration at 850. Optionally, the method 800 can also include operations such as: receiving a mobile application function request at 860 and processing the mobile application request at 870.

The method 800 can begin at operation 810 with the networked system 402 monitoring one or more geofences associated with physical locations. In an example, the networked system 402 can be configured to monitor geofences associated with various retail locations and other locations of interest to subscribing users (e.g., users of a particular mobile application or users registered with the networked system 402). The networked system 402 can also monitor multiple mobile devices, such as mobile devices 115, in reference to the geofences. At 820, the method 800 can continue with networked system 402 receiving, from a mobile device, such as mobile device 115, location data indicating a current location associated with the mobile device 115.

At 830, the method 800 can continue with the networked system 402 determining, based on the location data received from the mobile device 115, whether the mobile device 115 is within a monitored geofence (e.g., within a physical location of interest). If the networked system 402 determines that the mobile device 115 is within a physical location of interest (e.g., a geofence), then the method 800 can continue at 840, with the networked system 402 selecting a mobile application configuration corresponding to the physical location (e.g., geofence). At 850, the method 800 can continue with the networked system 402 transmitting the mobile application configuration to the mobile device 115.

Optionally, the method 800 can also include operation 860 that includes the networked system 402 receiving a mobile application function request from the mobile device 115. In an example, the method 800 can continue at 870 with the networked system 402 processing the mobile application function request based at least in part on the current location of the mobile device 115. For example, if the networked system 402 determines (at operation 830) that the mobile device 115 is located within an electronics retail store, the mobile application function request can be processed in light of this information. In this example, if the mobile application function request includes a product identifier, the networked system 402 can interpret the function request as a price comparison request, and process it accordingly.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures can be utilized. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
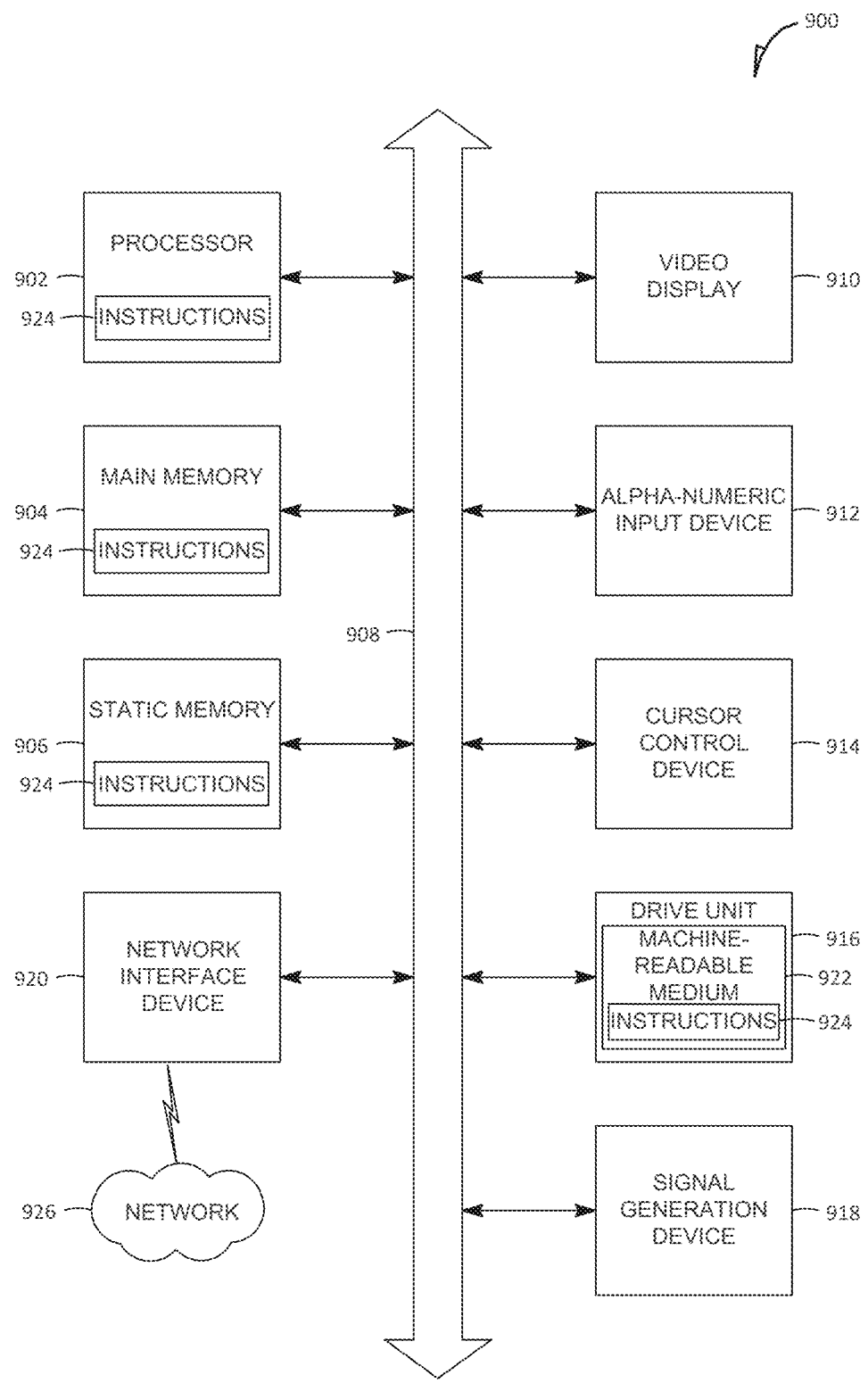
FIG. 9 is a diagrammatic representation of a machine in the example form of a computer system within which a set of instructions for causing the machine to perform any one or more of the methodologies discussed herein may be executed.

FIG. 9 is a block diagram of a machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal displays (LCD) or a cathode ray tube (CRT)). The computer system 900 also includes an alphanumeric input device 912 (e.g., a keyboard), a cursor control (user interface (UI) navigation) device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or used by any one or more of the methodologies or functions described herein. The instructions 924 may also reside, completely or at least partially, within the main memory 904, static memory 906, and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of various implementations, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for contextual in-store experience modification on a mobile device has been described. Although various implementations have been described with reference to specific example embodiments, it will be evident that various modifications and changes may be made to these embodiments without departing from the broader spirit and scope of the claimed subject matter. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the claimed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose limitations.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim.

We claim:

1. A computer-implemented method comprising:
monitoring a parent geofence that geographically encompasses a plurality of child geofences, each respective child geofence of the plurality of child geofences associated with a respective physical location within the parent geofence;
receiving location data that indicates a current location of a mobile device;
determining, based at least in part on the current location, that the mobile device has entered a particular child geofence of the plurality of child geofences within the parent geofence;
responsive to determining that the mobile device has entered the particular child geofence within the parent geofence, customizing a notification for a mobile application based on the particular child geofence within the parent geofence, the customized notification including inventory information associated with services available for purchase within the particular child geofence; and
transmitting the customized notification to the mobile device effective to cause the mobile application to display the customized notification.

2. The computer-implemented method of claim 1, wherein the customized notification includes an offer for the services available for purchase within the particular child geofence.

3. The computer-implemented method of claim 2, wherein the offer for the services available for purchase within the particular child geofence is based on a current inventory associated with the services available for purchase within the particular child geofence.

4. The computer-implemented method of claim 1, wherein the customizing further comprises customizing the notification on the mobile application based on the particular child geofence and a user profile associated with the mobile device.

5. The computer-implemented method of claim 1, further comprising selecting an application configuration for a mobile application, the application configuration corresponding to the particular child geofence.

6. The computer-implemented method of claim 5, further comprising transmitting the application configuration to the mobile device effective to alter a functionality of the mobile application at the mobile device based on the current location.

7. The computer-implemented method of claim 1, wherein the location data comprises Global Positioning System (GPS) coordinates.

8. A computer-implemented method comprising:
  receiving, using one or more servers, location data that indicates a current location of a mobile device;
  determining, using the one or more servers and based at least in part on the current location, that the mobile device has entered a geofence;
  selecting, using the one or more servers, an application configuration for a mobile application, the application configuration corresponding to the geofence;
  causing a functionality of the mobile application at the mobile device to be altered based on the current location;
  customizing a notification for the mobile application based on the geofence; and
  transmitting the customized notification to the mobile device effective to cause the mobile application to display the customized notification, the customized notification including inventory information associated with services available for purchase within the geofence.

9. The computer-implemented method of claim 8, wherein the causing the functionality of the mobile application at the mobile device to be altered comprises transmitting the application configuration to the mobile device effective to alter the functionality of the mobile application.

10. The computer-implemented method of claim 8, further comprising monitoring, using one or more servers, a parent geofence that geographically encompasses a plurality of child geofences, each respective child geofence of the plurality of child geofences associated with a respective physical location within the parent geofence.

11. The computer-implemented method of claim 10, wherein the determining comprises determining that the mobile device has entered a particular child geofence of the plurality of geofences, and wherein the application configuration is selected based on the particular child geofence.

12. The computer-implemented method of claim 8, wherein the customized notification includes an offer for the services available for purchase within the geofence.

13. The computer-implemented method of claim 12, wherein the offer for services is based on a current inventory associated with the services available for purchase within the geofence.

14. The computer-implemented method of claim 8, wherein the location data comprises Global Positioning System (GPS) coordinates.

15. A computer-implemented method comprising:
  altering, by a mobile application implemented at a mobile device, an application functionality of the mobile application based on a current location of the mobile device, the altered application functionality associated with a particular child geofence of a plurality of child geofences that is associated with a respective physical location within a parent geofence; and
  displaying, by the mobile application, a notification based on the particular child geofence, wherein the notification includes inventory information associated with services available for purchase within the particular child geofence.

16. The computer-implemented method of claim 15, wherein the notification includes an offer for the services available for purchase within the particular child geofence.

17. The computer-implemented method of claim 16, wherein the offer for services is based on a current inventory associated with the services available for purchase within the particular child geofence.

18. The computer-implemented method of claim 15, wherein the current location of the mobile device is determined based at least in part on Global Positioning System (GPS) coordinates.

19. The computer-implemented method of claim 15, wherein the notification is based on the particular child geofence and a user profile associated with the mobile device.

20. The computer-implemented method of claim 8, wherein the notification is based on the geofence and a user profile associated with the mobile device.

* * * * *